US012139275B2

(12) United States Patent
Schmidt et al.

(10) Patent No.: US 12,139,275 B2
(45) Date of Patent: Nov. 12, 2024

(54) GAS DISSOLUTION PREDICTION SYSTEM AND METHOD FOR AN AIRCRAFT SHOCK STRUT

(71) Applicants: SAFRAN LANDING SYSTEMS CANADA INC, Ajax (CA); SAFRAN LANDING SYSTEMS UK LTD, Gloucester (GB)

(72) Inventors: Robert Kyle Schmidt, Brooklin (CA); Jon Smith, Gloucester (GB)

(73) Assignees: Safran Landing Systems Canada Inc., Ajax (CA); Safran Landing Systems, Vélizy-Villacoublay (FR)

(*) Notice: Subject to any disclaimer, the term of this patent is extended or adjusted under 35 U.S.C. 154(b) by 842 days.

(21) Appl. No.: 17/081,302

(22) Filed: Oct. 27, 2020

(65) Prior Publication Data

US 2022/0127016 A1    Apr. 28, 2022

(51) Int. Cl.
| | |
|---|---|
| *B64F 5/60* | (2017.01) |
| *B64C 25/60* | (2006.01) |
| *G01L 19/00* | (2006.01) |
| *G01P 7/00* | (2006.01) |
| *G01P 15/00* | (2006.01) |

(52) U.S. Cl.
CPC ............... *B64F 5/60* (2017.01); *B64C 25/60* (2013.01); *G01L 19/0092* (2013.01); *G01P 7/00* (2013.01); *G01P 15/00* (2013.01)

(58) Field of Classification Search
CPC ....... B64F 5/60; B64C 25/60; G01L 19/0092; G01P 7/00; G01P 15/00
See application file for complete search history.

(56) References Cited

U.S. PATENT DOCUMENTS

| | | | | |
|---|---|---|---|---|
| 3,747,913 A | * | 7/1973 | Savery | F16F 9/063 |
| | | | | 188/316 |
| 4,939,153 A | * | 7/1990 | Meserole | G01N 25/147 |
| | | | | 436/79 |
| 5,800,626 A | * | 9/1998 | Cohen | H01L 21/67017 |
| | | | | 134/21 |
| 8,565,968 B2 | | 10/2013 | Nance | |
| 9,045,237 B2 | * | 6/2015 | Nance | G01M 17/04 |

(Continued)

FOREIGN PATENT DOCUMENTS

| | | | | |
|---|---|---|---|---|
| CN | 108593490 A | * | 9/2018 | .............. G01N 7/00 |
| EP | 3299792 A2 | | 3/2018 | |

OTHER PUBLICATIONS

S. Haider, "Overview of Prognostics and Health Management for Landing Gear Maintenance," 2019 Annual Reliability and Maintainability Symposium (RAMS), Orlando, FL, USA, 2019, pp. 1-7, doi: 10.1109/RAMS.2019.8768977.*

(Continued)

*Primary Examiner* — Luis A Martinez Borrero
(74) *Attorney, Agent, or Firm* — Christensen O'Connor Johnson Kindness PLLC

(57) ABSTRACT

Techniques and methodologies for servicing a shock strut are provided that account for the variability in gas solubility of the shock strut while in-service. These examples incorporate knowledge of the shock strut's stoke history in order to estimate/predict the amount of gas in solution, its percentage saturation, etc. This may permit a more refined knowledge of the true servicing state of the shock strut.

10 Claims, 7 Drawing Sheets

(56) References Cited

U.S. PATENT DOCUMENTS

| | | | |
|---|---|---|---|
| 9,285,007 B2* | 3/2016 | Fazeli | G01M 17/04 |
| 9,387,924 B2 | 7/2016 | Fazeli et al. | |
| 9,522,741 B2* | 12/2016 | Piroozmandi | B64D 45/00 |
| 9,773,357 B2 | 9/2017 | Fazeli et al. | |
| 9,856,038 B2* | 1/2018 | Fazeli | B64F 5/40 |
| 10,266,256 B2 | 4/2019 | Fazeli et al. | |
| 10,269,188 B2* | 4/2019 | Fazeli | B64C 25/60 |
| 11,465,777 B2* | 10/2022 | Brown | B64C 25/60 |
| 11,579,047 B2* | 2/2023 | Fazeli | F16F 9/3292 |
| 11,687,070 B2* | 6/2023 | Chandrashekar | F16F 9/3292 702/183 |
| 2004/0055941 A1* | 3/2004 | Weissenberg | B03D 1/028 210/221.2 |
| 2005/0109078 A1* | 5/2005 | Chen | G01N 33/0016 702/24 |
| 2008/0118418 A1* | 5/2008 | Morita | C02F 1/20 422/255 |
| 2009/0171532 A1 | 7/2009 | Ryan et al. | |
| 2012/0048383 A1* | 3/2012 | Tokoshima | B01F 23/23124 137/551 |
| 2012/0053783 A1* | 3/2012 | Nance | B64F 5/60 701/33.1 |
| 2014/0238797 A1* | 8/2014 | Blankenship | F16F 9/36 188/313 |
| 2014/0312171 A1* | 10/2014 | Schmidt | B64C 25/60 244/100 R |
| 2015/0266569 A1* | 9/2015 | Fazeli | F16F 9/06 29/402.01 |
| 2015/0267769 A1* | 9/2015 | Fazeli | G01F 22/02 701/29.5 |
| 2015/0269794 A1* | 9/2015 | Fazeli | B64C 25/60 701/34.4 |
| 2017/0166329 A1* | 6/2017 | Fazeli | B64F 5/60 |
| 2018/0058985 A1* | 3/2018 | Luce | G01M 17/04 |
| 2018/0273162 A1* | 9/2018 | Fazeli | B64C 25/60 |
| 2019/0009892 A1* | 1/2019 | Fazeli | B64C 25/60 |
| 2019/0177009 A1* | 6/2019 | Brown | F16F 9/3271 |
| 2019/0180522 A1* | 6/2019 | Fazeli | F16F 9/486 |
| 2019/0193846 A1 | 6/2019 | Luce et al. | |
| 2020/0011394 A1* | 1/2020 | Närdemann | B60G 13/08 |
| 2020/0025274 A1* | 1/2020 | Anderson | F16F 9/3292 |
| 2020/0249129 A1* | 8/2020 | Fazeli | F16F 9/3292 |
| 2020/0324920 A1 | 10/2020 | Fazeli et al. | |
| 2023/0160781 A1* | 5/2023 | Fazeli | B64F 5/60 244/102 R |

OTHER PUBLICATIONS

International Search Report and Written Opinion of the International Searching Authority mailed Jan. 20, 2022 issued in corresponding International Application No. PCT/CA2021/051466 filed Oct. 19, 2021, 9 pages.

Extended European Search Report mailed Sep. 5, 2024, issued in corresponding European Application No. 21884201.1, 8 pages.

* cited by examiner

GAS DISSOLUTION PREDICTION SYSTEM AND METHOD FOR AN AIRCRAFT SHOCK STRUT

BACKGROUND

Shock absorbing devices, such as shock absorbers or shock absorbing struts, are used in a wide variety of vehicle suspension systems for controlling motion of the vehicle and its tires with respect to the ground and for reducing transmission of transient forces from the ground to the vehicle. Shock absorbing struts are a common and necessary component in most aircraft landing gear assemblies. In particular, shock absorbing struts must control motion of the landing gear, and absorb and damp loads imposed on the landing gear during landing, taxiing and takeoff.

One type of shock-absorbing strut suitable for use in landing gear that can accomplish these benefits is an air-oil shock absorbing strut, generally referred to as a shock strut or oleo strut. An oleo strut generally accomplishes these functions by compressing a fluid within a sealed chamber formed by hollow telescoping cylinders. The fluid generally includes both a gas, such as air or nitrogen, and a liquid, such as hydraulic fluid or oil. In a typical arrangement, the oleo strut generally utilizes an "air-over-oil" arrangement wherein a trapped volume of gas (nitrogen or air) is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, a computer implemented method is provided for predicting a servicing state of a mixed shock strut. In an embodiment, the computer implemented method includes obtaining data, including data indicative of gas temperature of the shock strut, data indicative of the gas pressure of the shock strut, stroke position data over time, and strut specific design data; and calculating a present gas solubility state based on the obtained data.

In according with another aspect of the present disclosure, a system is provided for determining a service condition of a shock strut. In an embodiment, the system includes a stroke position sensor configured to generate data indicative of stroke position of the shock strut; and an ECU. The ECU is programmed to: obtain data, including the stroke position data, and strut specific design data; calculate a present gas solubility state based on the obtained data, including a shock strut velocity obtained from the data indicative of stroke position.

In accordance with another embodiment of the present disclosure, a system is provided for determining a service condition of a shock strut. In an embodiment, the system includes a stroke position sensor configured to generate stroke position data of the shock strut; a temperature sensor configured to generate gas temperature data of the shock strut; a pressure sensor configured to generate gas pressure data of the shock strut, and an ECU. The ECU is programmed to: obtain data, including the gas temperature data, the gas pressure data, the stroke position data, and strut specific design data; calculating a present gas solubility state based on the obtained data.

In any of the preceding claims, stroke position over time data is collected as long as a since landing condition is met.

In any of the preceding claims, an ECU is programmed to determine whether a since landing condition of the shock strut.

In any of the preceding claims, stroke, the since landing condition includes a loaded position of the shock strut.

In any of the preceding claims, calculating a present gas solubility state based on the obtained data includes determining a percentage saturation of the shock strut.

In any of the preceding claims, determining a percentage saturation of the shock strut includes calculating $K_{SAT} \times \int SAT\, dt + K_{SAV} \times \int SAV\, dt + K_{SATV} \times SAT^n \times SAV\, dt$;

wherein $K_{SAT}$, $K_{SAV}$, and $K_{SATV}$, and n are obtained from the strut specific design data;

wherein SAT is shock strut travel; and wherein SAV is shock strut velocity.

In any of the preceding claims, calculating a present gas solubility state based on the obtained data further includes multiplying the determined percentage saturation of the shock strut by Henry's characteristic H(C) for the shock strut, the pressure of the gas, and a volume of oil of the shock strut.

In any of the preceding claims, the present gas solubility state based on the obtained data is a percentage saturation of the shock strut.

In any of the preceding claims, the stroke position sensor is an accelerometer, and shock strut velocity is obtained by integration of data generated by the accelerometer.

In any of the preceding claims, stroke, an ECU is programmed to calculate the present gas solubility state by determining a percentage saturation of the shock strut.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
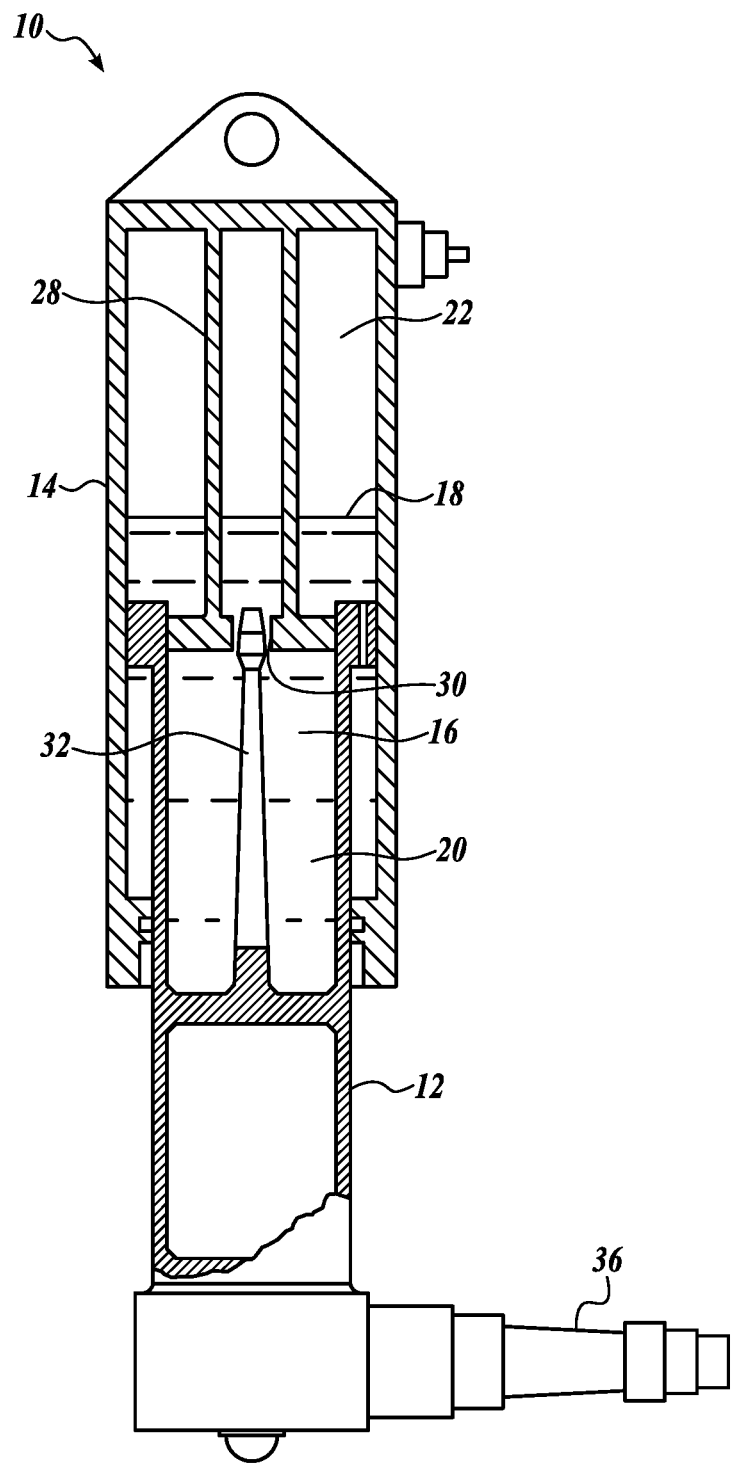
FIG. 1 is a cross-sectional view of a conventional oleo-pneumatic strut.

Oleo struts are used in landing gear of most aircraft. Oleo struts can be of the separated type (gas is separated from oil) or of unseparated type (gas and oil are in contact with each other). Unseparated oleo struts are sometimes referred to as mixed struts. One oleo strut of the unseparated type known in the prior art is disclosed in U.S. Pat. No. 9,914,532, and is shown in FIG. 1. Referring to FIG. 1, the strut 10 comprises an inner housing portion 12 slidably coupled in an outer housing portion 14. The inner and outer housing portions 12, 14 together define an internal cavity 16, which contains a fluid 18 comprised of an oil 20 contained in a lower portion thereof and a gas 22 contained in an upper portion thereof. The strut 10 also includes an orifice support tube 28 that defines a conventional damping orifice 30 at its axial end. An optional metering pin 32 can be provided for interacting with the damping orifice 30 in order to improve the efficiency of the strut 10. Attached to the inner housing portion 12 is an axle 36 to which a wheel is rotatably mounted.

This type of shock strut is widely used in a number of landing gear, especially the landing gear of large transport aircraft and airliners as it is simple, light weight, and robust. Functionality of a landing gear shock strut depends on its gas pressure and oil volume. To ensure the landing gear functions properly, the oil level and gas pressure of the shock strut should be maintained within a suitable range according to design requirements of the system. Gas pressure and oil level are typically maintained according to standard maintenance schedules, or more frequently if aircraft personal notice a problem, for example, via physical inspection.

Figure 2:
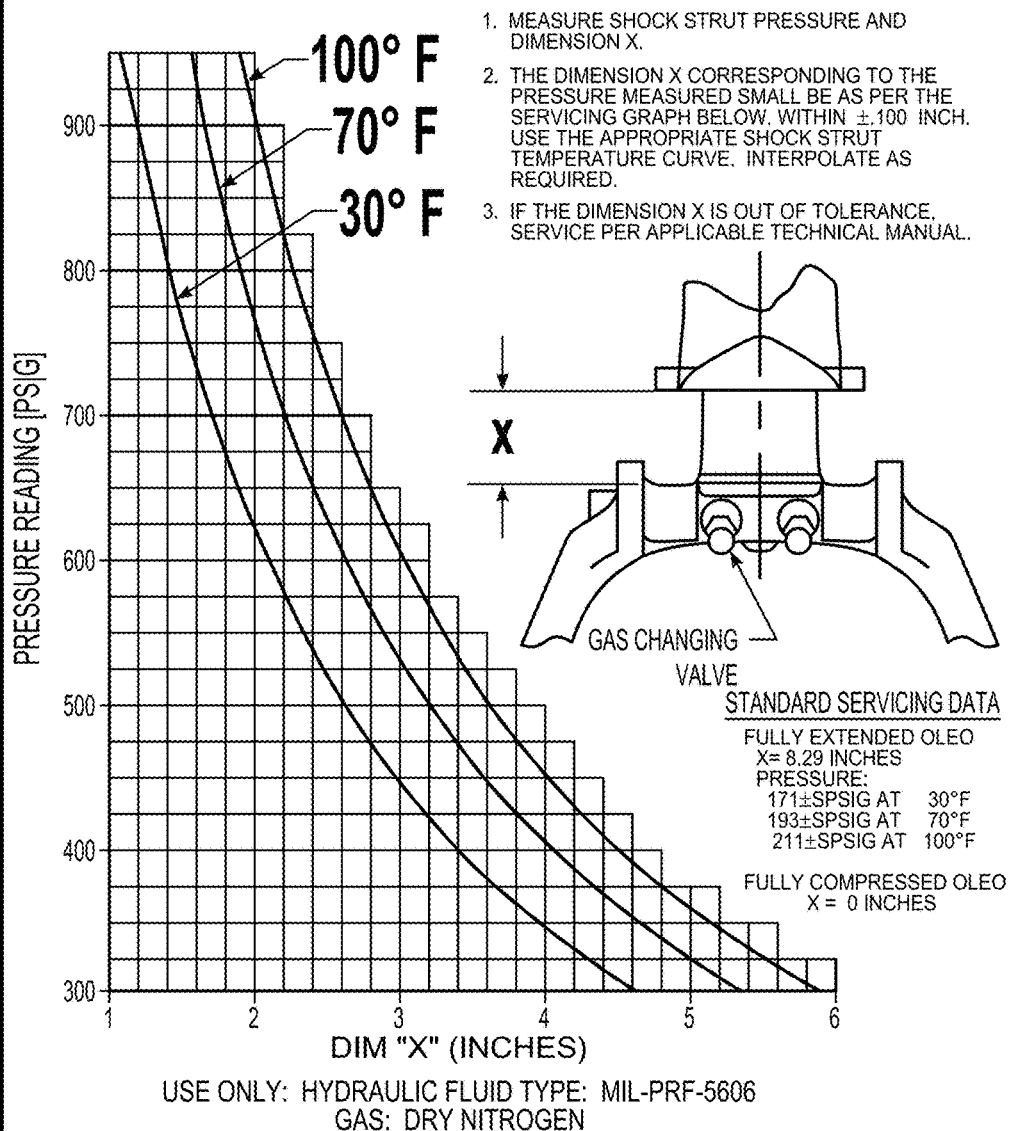
FIG. 2 is a conventional gas spring chart for servicing a shock strut, such as the shock strut of FIG. 1.

A typical shock absorber servicing approach during pre/post flight maintenance is to check the temperature and pressure at a certain amount of shock strut compression (e.g., the static position of the inner portion 12 in relation to the outer portion 14 in FIG. 1) sometimes referred to as stroke position in accordance with a gas spring chart for the particular shock strut type. One example of such a gas spring chart is depicted in FIG. 2, which is reproduced from SAE ARP5908A. Any deviation from the chart is typically compensated by re-servicing the shock strut with gas.

This servicing method has one major flaw in that it assumes the strut's gas solubility is constant. In other words, it is assumed that the solubility of the inflation gas (used to provide the spring) in the oil (used to provide damping) in shock struts of the mixed type is constant.

However, the inventors of the present disclosure believe that the shock strut's gas solubility (e.g., percentage of oil saturation, the amount of gas in solution, etc.,) is highly dynamic (i.e., not constant). While Henry's Law predicts the maximum amount of gas which can be held in solution, the inventors believe that this theoretical maximum is rarely approached unless significant time is permitted or significant mixing/agitation of the oil and gas is performed.

Accordingly, the servicing approach described above does not properly account for this variability in gas solubility of the shock strut. Stated differently, the percentage of gas dissolved in the oil (e.g., percentage of oil saturation) at a given time is not taken into account with known servicing approaches. For example, some servicing charts like the one shown in FIG. 2 do not account for gas solubility.

Thus, the impact of variable or non-constant gas solubility on a shock strut in-service is that at any given time an unknown percentage of the gas in the shock strut is dissolved in the oil and unavailable to participate in the gas spring. Accordingly, an in-service shock strut may be considered "soft" by an unknown amount. If this shock strut is serviced according to a servicing chart like FIG. 2, or "topped up" with gas, then following takeoff the shock strut may be found to be overpressurized (or overly stiff). As a result, the shock strut may not provide proper functionality to the landing gear during critical times, such as a landing event.

The following description provides several examples of techniques and methodologies that account for the variability in gas solubility of a shock strut while in-service. These examples incorporates knowledge of the shock strut's stroke history in order to estimate/predict the amount of gas in solution, its percentage saturation, etc. This may permit a more refined knowledge of the true servicing state of the shock strut.

In some examples, these methodologies and technologies predict, for a mixed shock strut such as the shock strut of FIG. 1, the present gas solubility state as either a percentage of oil saturation or the total amount of gas dissolved in the oil. As will be described in more detail below, these techniques and methodologies can be implemented for shock struts of a vehicle, such as an aircraft (e.g., airplane, helicopter, etc.).

In that regard, the present disclosure provides one or more computer implemented methods for predicting the present gas solubility state (e.g., amount of gas dissolved in oil, percentage saturation, etc.) in an aircraft shock strut without requiring a direct measurement of gas solubility. Instead, the computer implemented method(s) determines the present gas solubility state based on easily measurable phenomena: temperature, gas (or oil) pressure, and stroke position vs. time. With this information, among other things, the shock strut can be checked to see if it was properly serviced. Without knowledge of this information, any measurement made of temperature, stroke position, and pressure (such as accomplished with the gas spring curves of FIG. 2) will result in an improperly serviced shock strut.

In accordance with an aspect of the disclosure, a computer implemented method for predicting gas solubility of a shock strut includes obtaining data indicative of shock strut pressure, obtaining data indicative of shock strut temperature, and obtaining data indicative of shock strut stroke position over time. Based on such data and strut specific design data, the computer implemented method determines, for example, the amount of gas present in the oil of the shock strut, the percentage saturation of the strut, etc.

In other embodiments, a computer implemented method for predicting gas solubility of a shock strut includes obtaining data indicative of shock strut stroke position over time. Based on such data and strut specific design data, the computer implemented method determines, for example, the percentage saturation of the strut, etc. In some embodiments, such data can be provided by an accelerometer.

In some of these embodiments, the computer implemented method uses data indicative of stroke position over time that is obtained after the vehicle, such as an aircraft, has landed. In some embodiments, this includes the landing event and vehicle taxiing to the gate or service area of the aircraft. In other embodiments, the computer implemented method uses such data collected when the shock strut is not in an in-flight condition (i.e., uncompressed or non-loaded state).

With the output (e.g., gas solubility state prediction) of the computer implemented method, more precise automated servicing tools can be employed. For example, the output of the computer implemented method(s) can be used to indicate to line servicing personnel whether the shock strut is indeed serviced properly.

Although some embodiments of the present disclosure will be described with reference to shock struts for an aircraft, one skilled in the relevant art will appreciate that the disclosed embodiments are illustrative in nature, and therefore, should not be construed as limited to applications with an aircraft. It should therefore be apparent that the techniques and methodologies set forth by one or more representative embodiments of the present disclosure have wide application, and may be used in any situation where a shock absorbing device is used.

Figure 3:
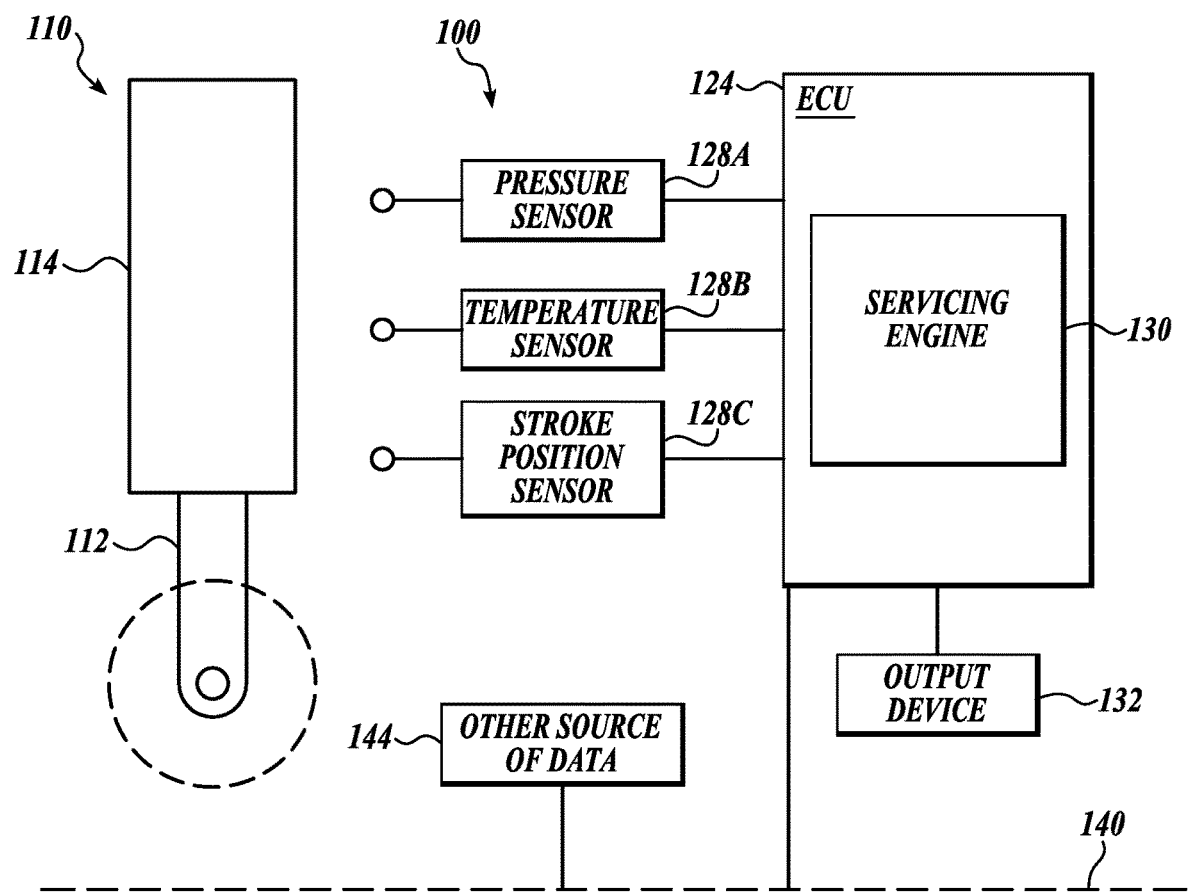
FIG. 3 is a schematic block diagram of a representative servicing state determination system in accordance with an embodiment of the present disclosure.

FIG. 3 depicts in block diagrammatic form one example of a servicing state determination system, generally designated 100, formed in accordance with aspects of the present disclosure. The servicing state determination system 100 is capable of carrying out one or more of the methods described above for determining predicting present gas solubility of a mixed shock strut. The system 100 can be applied to any mixed fluid-gas shock strut, including the shock strut of FIG. 1.

As best shown in FIG. 3, the servicing state determination system 100 includes a computing device, such as a signal processor, a controller or an electric control unit (ECU) 124, connected in electrical communication with one or more sensors 128 that are associated with a shock strut 110 having a telescoping lower portion 112 and an upper portion 114. In use, the ECU 124 receives input signals from the one or more sensors 128 and processes these signals and/or others according to logic rules implemented by a servicing engine 130 for determining the present gas solubility state of the shock strut 110. In some embodiments, the ECU 124 is configured to transmit signals to one or more output devices 132 based on the determined gas solubility in order to convey a service state condition. In some embodiments, the service state condition may indicate an "overinflated" condition, an "uninflated" condition, or simply a "needs service" condition, etc.

Each of the sensors 128 generates a signal based on a physical measurement of a condition associated with the shock strut 112. In the embodiment shown, the sensors include a pressure sensor 128A, a temperature sensor 128B, and stroke position sensor 128C mounted on or otherwise associated with the shock strut 110. Of course, the pressure sensor 128A and the temperature sensor 128B can be in the form of individual sensors or can be in the form of a combined pressure/temperature sensor. In some embodiments, the signals generated by the sensors 128 comprise a time series of values. The generated signals are then either preprocessed and transmitted or transmitted without further processing to the ECU 124.

In use, the pressure sensor 128A is configured to sense the gas pressure of the shock strut 110 and generate a signal indicative thereof. Similarly, the temperature sensor 128B is configured to sense the gas temperature of the shock strut 110 and generate a signal indicative thereof.

On the other hand, the stroke position sensor 128C is configured to sense the amount of travel of the telescoping lower portion 112 of the shock strut 110 with respect to the upper portion 114 of the shock strut 110. In some embodiments, the stroke position sensor 128C directly measures the amount of linear travel of the lower telescoping portion 112. In that regard, any sensor that is capable of measuring linear travel can be used as the stroke position sensor. In some embodiments, the stroke position sensor 128C may include one or more of a linear encoder, a hall effect sensor, an eddy current sensor, a linear variable differential transformer (LVDT), a sliding potentiometer, etc.

In other embodiments, the stroke position sensor 128C indirectly measures the amount of travel of the lower telescoping portion 112 via an associated structure component(s) of the landing gear, such as an upper torque link (not shown). In one embodiment, a rotational sensor can be used as the stroke position sensor 128C to measure the amount of rotation of the upper torque link in relation to the upper portion 114 as the telescoping lower portion 112 strokes between the extended and retracted positions. In these embodiments, the stroke position sensor 128C may include one or more of a rotary encoder, a potentiometer, etc.

In yet other embodiments, the data to be obtained from the stroke position sensor 128C may be obtained by an accelerometer mounted on the axle of the landing gear 110. In this embodiment, the ECU 124 can be configured to obtain position data by twice integration of the accelerometer signals. In these embodiments, stroke velocity can be also obtained by a single integration of the accelerometer signals, as needed.

As shown in FIG. 3, the ECU 124 can be connected directly (wired or wirelessly) to the one or more sensors 128 or indirectly via a controller area network (CAN) 140. Those skilled in the art and others will recognize that the CAN 140 may be implemented using any number of different communication protocols known in the art to send and/or receive data over suitable communication links.

The ECU 124 may also communicate with other electronic components of the vehicle either directly or via the CAN 140. For example, the ECU 124 may receive data from other sources of data, designated 144, which can be, for example, an engine controller. In that regard, in one embodiment, engine off signals, engine thrust level signals, etc. can be received by the ECU 124. Other sources of data may optionally include undercarriage door sensors, electric motor actuation sensors associated with retractable landing gear, passenger door sensors, etc. Of course, any data available over vehicle data bus, include over the CAN 140, can be utilized by the ECU 124 for carrying out the methodologies and technologies of the present disclosure.

As shown in FIG. 3, the ECU 124 is a dedicated controller. However, it will be appreciated that the ECU 124 may be an engine, which could be embedded within an existing on-board controller or computer, such as the Full Authority Digital Engine Control (FADEC), a general purpose controller, the centralized computer of the vehicle, etc. The term "engine" in the above phrase "the ECU may be an engine" or similar reference to "engine" herein refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof. In some embodiments, the engines can be implemented by one or more circuits, programmable processors, application specific integrated circuits (ASICs), programmable logic devices (PLDs), field programmable logic devices (FPLDs), Digital Signal Processors (DSPs), System on a Chip (SoC), etc.

Figure 4:
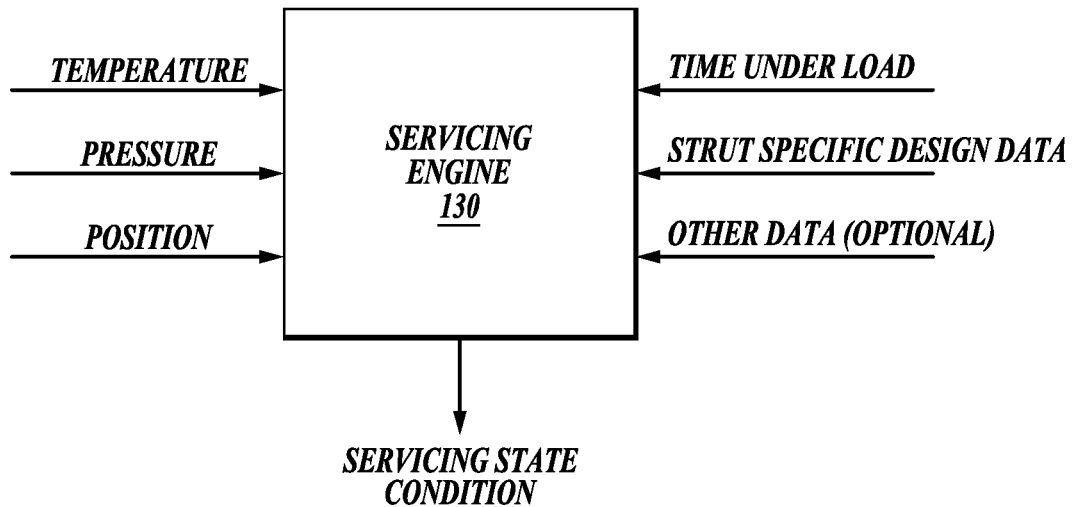
FIG. 4 is a schematic diagram of a representative servicing engine, such as a gas solubility prediction engine, according to an embodiment of the present disclosure.

FIG. 4 is a schematic diagram of a representative servicing engine 130 in accordance with an embodiment of the present disclosure. Simply stated, as shown in FIG. 4, the servicing engine 130 is configured to receive data in the form of temperature, pressure, stroke position, time under load, strut specific design data, process the data according to suitable logic rules, and output a service state condition. In some embodiments, the service state condition is simply the value of the percentage saturation or amount of gas dissolved in the oil. In other embodiments, the service state condition indicates an "overinflated" condition, an "uninflated" condition, or simply a "needs service" condition, etc., as described above.

Figure 5:
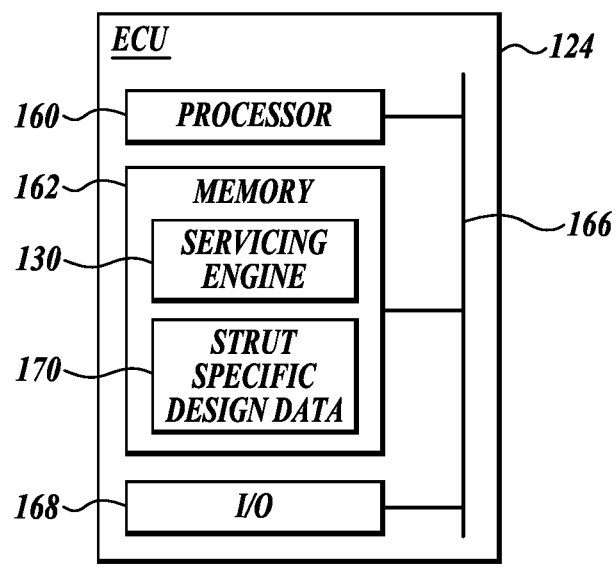
FIG. 5 is a schematic block diagram of a representative electric control unit (ECU) according to an embodiment of the present disclosure.

Turning now to FIG. 5, there is shown is a block diagram that illustrates aspects of a representative computing device or ECU 124 appropriate for use as a computing device in embodiments of the present disclosure. In its most basic configuration, the ECU 124 includes a processor 160, memory 162, and a servicing engine, such as servicing engine 130, stored on the memory 164 connected by a communication bus 166.

The memory 164 may include computer readable storage media in read-only memory (ROM), random-access memory (RAM), and keep-alive memory (KAM), for example. The KAM may be used to store various operating variables or program instructions while the processor 160 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, including strut specific design data 170, one or more look-up tables (LUTs), as well be described in more detail below. In some embodiments, the ECU 124 may include additional components including but not limited to a high speed clock, analog to digital (A/D) and digital to analog (D/A) circuitry, and appropriate signal conditioning and buffer circuitry.

Still referring to FIG. 5, the processor 160 in some embodiments communicates with the one or more sensors 128 directly or indirectly via an input/output (I/O) interface 168 and suitable communication links. The input/output (I/O) interface 168 may be implemented as a single integrated interface that provides various raw data or signal conditioning, processing, and/or conversion, short-circuit protection, and/or the like. Alternatively, one or more dedicated hardware or firmware chips may be used to condition and process particular signals before being supplied to the processor 160. In some embodiments, the signals transmitted from the input/output (I/O) interface 168 may be suitable digital or analog signals to control or provide information to an output device. In some embodiments, the input/output (I/O) interface 168 may include a network interface comprising one or more components for communicating with other sources of data 144 over a network, such as the CAN 140. In other embodiments, the ECU 124 includes a network interface separate from the input/output (I/O) interface 168.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "controlling component" or "processing component" can be used to generally describe these aforementioned components, and can be either hardware or software, or combinations thereof, that implement logic for carrying out various aspects of the present disclosure.

In some embodiments, the processor 160 executes instructions stored in memory 162, including servicing engine 130. These instructions may include, for example, a set of algorithms, including resident program instructions stored in one of the storage mediums and executed to provide desired functions. Information transfer to and from the servicing engine 130 can be accomplished by way of a direct connection, a local area network bus and a serial peripheral interface bus. The algorithms may be executed during preset loop cycles such that each algorithm is executed at least once each loop cycle. Algorithms stored in the non-volatile memory devices are executed by the processor 160 to monitor inputs from the sensing devices, such as the sensors 128, and other data transmitting devices, or polls such devices for data to be used therein. Loop cycles are executed at regular intervals, for example each 3.125, 6.25, 12.5, 25 and 100 milliseconds during ongoing operation of the vehicle. Alternatively, algorithms may be executed in response to the occurrence of an event.

The system 100 may further include any of a number of output devices 132, such as visual output devices (e.g., lights, displays, gauges) and/or audible output devices (e.g., speakers, etc.) In some embodiments, the output device(s) 132 may be stand alone, integrated with the instrument panel of the vehicle, and/or located and/or integrated with any other suitable structure in the vehicle.

Figure 6:
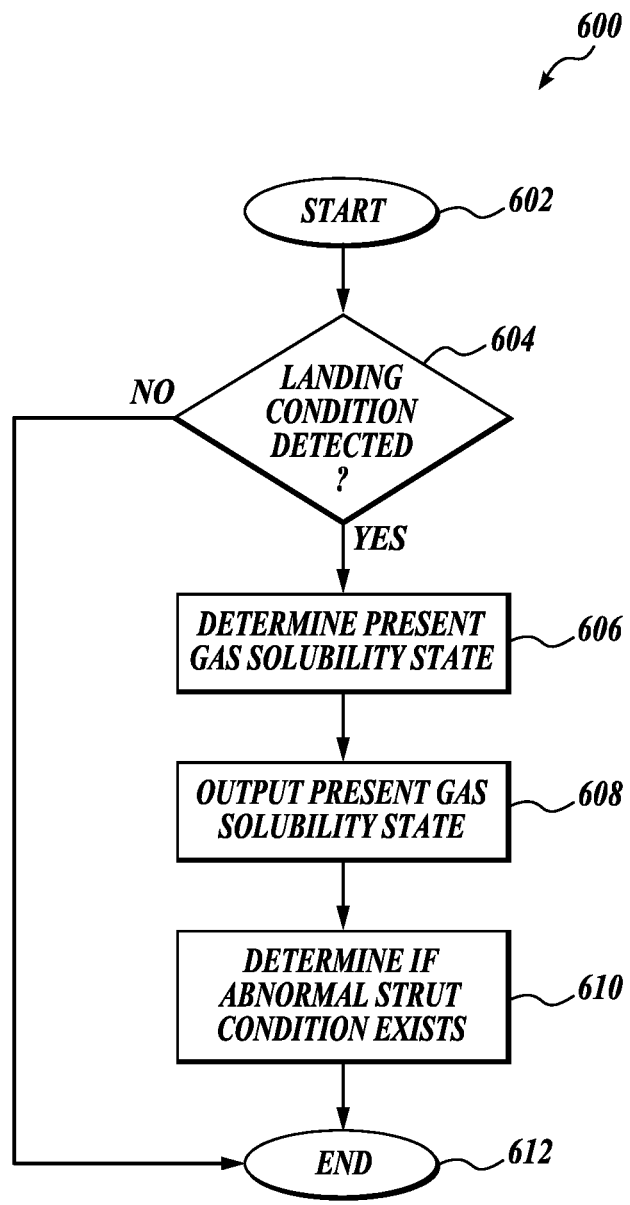
FIG. 6 is a flow chart depicting a method for predicting the present gas solubility state of a shock strut, such as the shock strut of FIG. 1, in accordance with an embodiment of the present disclosure.

In some embodiments, the set of instructions provided by the servicing engine 130, when executed by the processor 160, carries out, for example, the method 600 set forth in FIG. 6. During the method 600, data from sensors 128 is collected continuously and is stored in memory 162.

As shown in FIG. 6, the method 600 begins at block 602 and proceeds to block 604 where it is determined whether or not a landing condition is present. As used in the following paragraphs, a landing condition includes a landing event and any subsequent taxiing of the aircraft. As will be described in detail below, a landing condition and since landing can be used interchangeable.

In some embodiments, this determination can be carried out with information indicative of the compression state (e.g., compressed or uncompressed) of the shock strut 110. Such information can be supplied by the stroke position sensor 128C. For example, the servicing engine 130 may determine that an aircraft has landed and/or is stationary by monitoring the stroke position of the shock strut. Alternatively, information indicative of the compression state (e.g., compressed or uncompressed) of the shock strut 110 can be supplied by the pressure sensor 128B. For example, the servicing engine 130 may determine that an aircraft has landed and/or is stationary by monitoring the pressure within shock strut 110.

In other embodiments, this determination can be achieved with information supplied by other devices of the aircraft. For example, the ECU 124, namely the engine 130, may receive data from other sources of data 144, which can include an engine controller (e.g., FADEC) configured to monitor and/or control operation of the aircraft engine(s). In that regard, the engine controller may provide data, such as engine off signals, engine thrust signals, etc., that indicate whether or not a landing condition is present. Other data generated by the aircraft can be also or alternatively employed. For example, data from undercarriage door sensors, retractable landing gear electric motors, passenger door sensors, etc., can be used to determine whether a landing condition is present.

If it is determined at block 604 that the aircraft is not in a landing condition, or in other words, is in-flight (the shock strut is in an uncompressed state), the method 600 proceeds to block 612 and ends. Otherwise, the method proceeds to block 606.

At block 606, the present gas solubility state of the shock strut 110 is determined. In accordance with an aspect of the present disclosure, the method 600 determines the present gas solubility state (e.g., amount of gas in solution, percentage saturation, etc.) based on the following principles. In-service experience and laboratory testing have shown there are two modes of gas migration into solution: diffusion in the static state and dynamic mixing. Diffusion is dominated by time, temperature, pressure, and the ratio of the volume to the exposed area of the oil/gas interface. The process is slow—for a shock strut in use the amount of gas in solution is dominated by dynamic mixing. The amount of gas which goes into solution during dynamic mixing is a function of the specific design of the shock strut, and is related to total stroke travel of the shock strut (i.e., the total distance in which the lower portion 112 moves in relation to the upper portion 114), and the speed of stroke travel of the shock strut 110.

Of course, different shock strut designs will result in varying amounts of mixing for a given stroke or speed of stroke of the shock strut. For instance, strut designs having a plain orifice and a metering pin, such as the strut of FIG. 1, can result in 'jetting' of the fluid into the gas during high velocity compression of the shock strut. Likewise, strut designs having a plain orifice without a metering pin can also result in 'jetting' of the fluid into the gas during high velocity compression of the shock strut. In other designs, which baffle the orifices or immerse the orifices in oil at all times will result in less oil/gas exposure for a given motion.

According to the present disclosure, the present level or state of gas solubility, sometimes referred to as gas concentration, is either the percentage saturation of the gas or the percentage saturation multiplied by the maximum theoretical amount of dissolved gas (determined by Henry's Law coefficient and gas pressure set forth below). Percentage saturation of the gas can be determined by the following equation:

$$\% \text{ saturation} = fn(\text{history of oil and gas mixing since landing}); \quad \text{Eq. (1)}$$

In equation (1) above, the history of oil and gas mixing is presumed to be a function of the integration of shock absorber travel (SAT) since landing, the integration of the shock absorber velocity (SAV) since landing and the integration of the product of SAT raised to the nth power and SAV since landing. "Since landing" in some embodiments includes a landing event and any taxiing of the aircraft to the gate or service area. "Since landing" in other embodiments includes a landing event and any taxiing that occurs thereafter, including any subsequent take-off. In these latter embodiments, "since landing" can also refer to any event of the aircraft in which the shock strut is not in an uncompressed or non-loaded state (e.g., in flight), and may be referred to as a landing condition.

This can be expressed as:

$$\% \text{ saturation} = K_{SAT} \times \int SAT \, dt + K_{SAV} \times \int SAV \, dt + K_{SATV} \times \int SAT^n \times SAV \, dt \quad \text{Eq. (2)}$$

In equation (2) above, n can be presumed to be negative since jetting of the oil into the gas typically reduces as the shock absorber travel (SAT) increases.

As generally known in the art, the maximum theoretical amount of gas that can dissolve into the oil is controlled by Henry's Law. Henry's Law states that at a constant temperature, the amount of a gas that dissolves in a liquid is directly proportional to the partial pressure. Henry's Law is usually expressed as:

$$\text{Maximum dissolved gas} = H(C) \times P \times V_{oil} \quad \text{Eq. (3)}$$

In equation (3) above, H(C) is Henry's characteristic for the specific combination of gas and oil, P is the pressure in the shock strut, and $V_{oil}$ is the total volume of the oil in the shock strut. The total volume of oil and Henry's characteristic can be stored as data in memory 162. In some embodiments, in addition to pressure, Henry's characteristic H(C) can be calculated as a function of temperature. In some embodiments, Henry's factor H(C) may be calculated using a predetermined formula corresponding to the particular type of oil in shock strut. Calculating Henry's characteristic as a function of temperature may allow for a more accurate calculation of the servicing state of shock strut, for example.

Combining the maximum amount of dissolved gas (equation (3)) with the percentage saturation (equation (2)) results in the total amount of dissolved gas:

$$\text{Gas}_{total\ dissolved} = (K_{SAT} \times \int SAT \, dt + K_{SAV} \times \int SAV \, dt + K_{SATV} \times \int SAT^n \times SAV \, dt) \times H(C) \times P \times V_{oil} \quad \text{(Eq. 4)}$$

The coefficients $K_{SAT}$, $K_{SAV}$, $K_{SATV}$, sometimes referred to herein as strut specific design data, and the index n vary depending on the shock strut configuration. These coefficients and n value can be determined by analysis of test data (e.g., drop test, rig test and flight test) for each shock absorber design. Once established for a particular shock strut design, these coefficients can be presumed to be constant for all shock absorbers of that design.

Therefore, at block 606, the engine 130 carries out the calculation of equation (4) based on the strut specific design data (i.e., K coefficients) of the associated shock strut. The strut specific design data can be stored in the memory 162 or accessed from other storage via the CAN 140. In other embodiments, the servicing engine 130, at block 606, can carry out the calculation of equation (2) based on the strut specific design data (i.e., K coefficients) stored in memory 192 or accessed from other storage via the CAN 140. In this embodiment, the present gas solubility state of the shock strut is assessed by calculating the percentage of saturation of the oil.

In some embodiments, when the ECU 124, namely the servicing engine 130, in response to data obtained by the one or more sensors 128, and strut specific design data, determines present gas solubility state as either a total amount of gas dissolved in oil or as percentage of saturation, the ECU 124, namely the servicing engine 130, causes one or more of the output devices 30 to broadcast a condition alert, such as an abnormal condition alert, to the user. An abnormal condition alert may represent a condition of the shock strut that is outside the performance envelope of the shock strut. In other embodiments, the engine 130 may cause the calculated percentage of saturation to be displayed.

Figure 8:
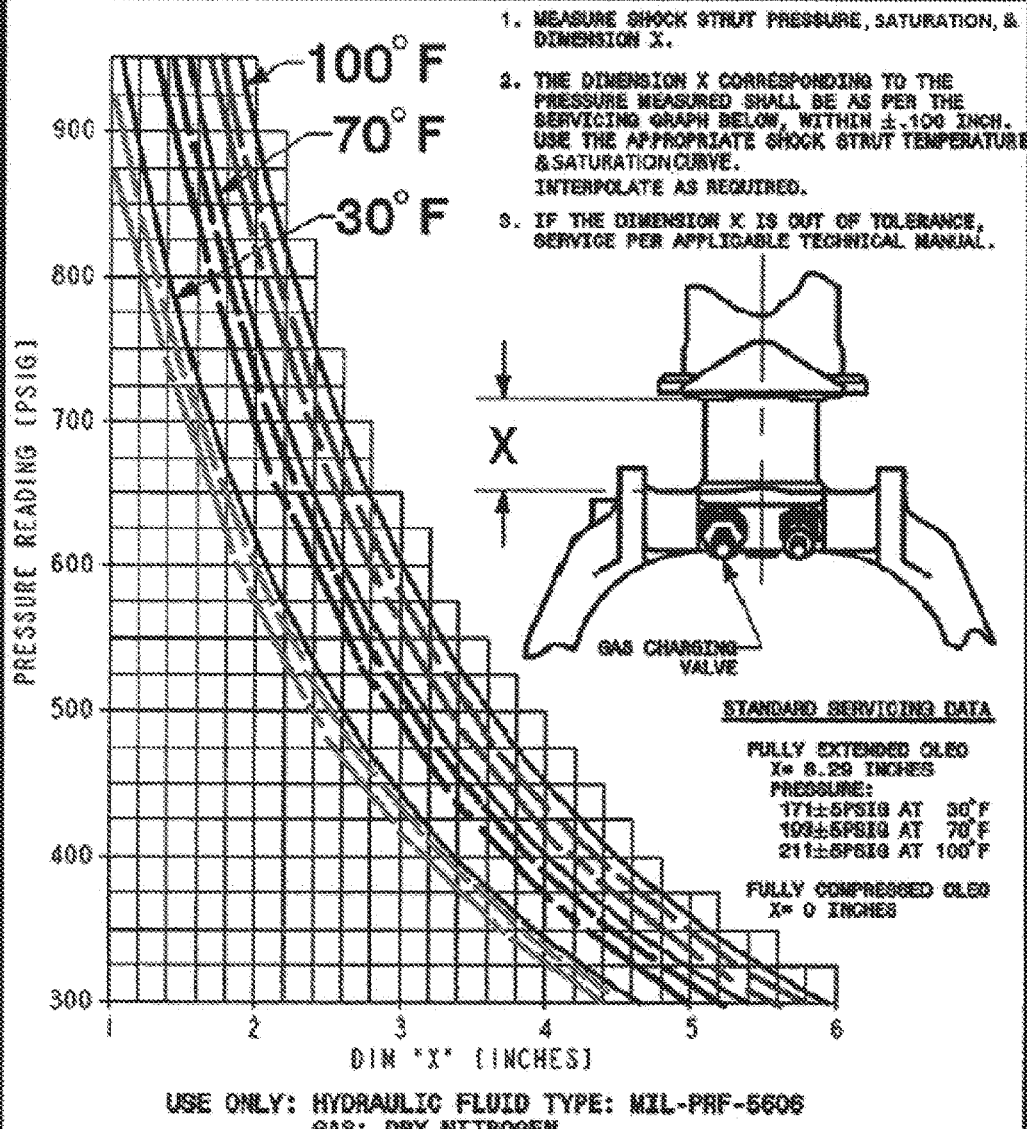
FIG. 8 is a gas spring chart in accordance with an embodiment of the present disclosure.

For example, the ECU 124 in some embodiments may cause a display to signal an abnormal condition alert if the gas solubility is different from an expected value stored in memory 162. In other embodiments, a look-up table (LUT) stored in memory 162 can be accessed to determine whether an abnormal condition exists. For example, the LUT may include data represented by the gas spring curves shown in FIG. 8. FIG. 8 is a servicing chart that accounts for variability of gas solubility.

Figure 7:
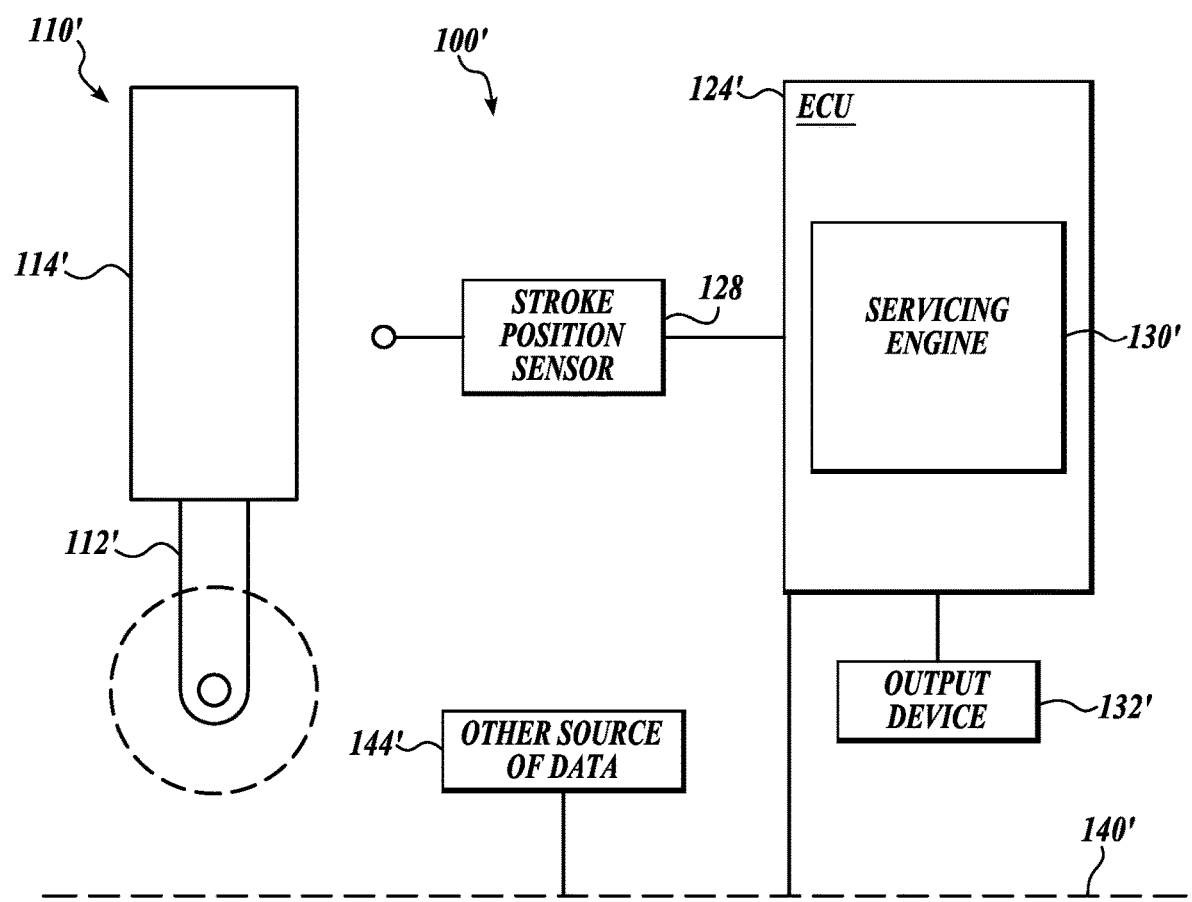
FIG. 7 is a schematic block diagram of another representative servicing state determination system in accordance with an embodiment of the present disclosure.

In other embodiments, the gas spring chart of FIG. 8 can be referenced by a technician with the percentage of saturation calculation output from the ECU 124. In this embodiment, the technician can either access the temperature and pressure data stored in memory 162 or can independently measure the pressure and temperature at the time of servicing. In some embodiments, both the temperature and pressure sensor can be omitted in embodiments where the technician uses the chart of FIG. 8 with independent measurements of temperature and pressure. Such as system, generally designed 100', is shown in FIG. 7. With the percentage of saturation calculation, along with the temperature and pressure measurements, the technician can determine whether the shock strut is in an abnormal state. Of course, these same percentage of saturation calculations along with the independent measurements of temperature and pressure can be input by the technician into an automated servicing tool for determining an abnormal state.

It is believed that the percentage of saturation calculation from equation (2) above may be dominated by shock strut velocity. Thus, in an embodiment, an accelerometer can be employed as the position sensor in system 100'. In this embodiment, the accelerometer is mounted to the axle of the landing gear 110'. With the accelerometer data, the servicing engine 130' can calculate shock strut velocity via integration of the data. An estimate of position could also be derived from the accelerometer measurements. With these calculations, percent saturation could then be estimated.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known method/process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A computer implemented method for predicting a servicing state of a mixed shock strut, comprising:
   obtaining data, including data indicative of gas temperature of the mixed shock strut, data indicative of gas pressure of the mixed shock strut, stroke position data over time, and strut specific design data;
   calculating a present gas solubility state of the mixed shock strut based on the obtained data,
   wherein calculating a present gas solubility state of the mixed shock strut based on the obtained data includes determining a percentage saturation of the shock strut, and
   wherein determining a percentage saturation of the shock strut includes:
   calculating $K_{SAT} \times \int SAT\, dt + K_{SAV} \times \int SAV\, dt + K_{SATV} \times \int SAT^n \times SAV\, dt$;
   wherein $K_{SAT}$, $K_{SAV}$, and $K_{SATV}$, and n are obtained from the strut specific design data;
   wherein SAT is shock strut travel; and
   wherein SAV is shock strut velocity.

2. The computer implemented method of claim 1, wherein stroke position over time data is collected as long as a landing condition is met.

3. The computer implemented method of claim 2, wherein the landing condition includes a loaded position of the shock strut.

4. The computer implemented method of claim 1, wherein calculating a present gas solubility state based on the obtained data further includes multiplying the determined percentage saturation of the shock strut by Henry's characteristic H(C) for the shock strut, the pressure of the gas, and a volume of oil of the shock strut.

5. A system for determining a service condition of a shock strut, comprising:
   a stroke position sensor configured to generate data indicative of stroke position of the shock strut;
   an electric control unit (ECU) programmed to:
      obtain data, including the stroke position data and strut specific design data;
      calculate a present gas solubility state based on the obtained data, including a shock strut velocity obtained from the data indicative of stroke position,
   wherein the stroke position sensor is an accelerometer, and the shock strut velocity is obtained by integration of data generated by the accelerometer.

6. The system of claim 5, wherein the present gas solubility state based on the obtained data is a percentage saturation of the shock strut.

7. A system for determining a service condition of a shock strut, comprising:
   a stroke position sensor configured to generate stroke position data of the shock strut;
   a temperature sensor configured to generate gas temperature data of the shock strut;
   a pressure sensor configured to generate gas pressure data of the shock strut, and
   an ECU programmed to:
      obtain data, including the gas temperature data, the gas pressure data, the stroke position data, and strut specific design data;
      calculating a present gas solubility state based on the obtained data,
   wherein the ECU is programmed to calculate the present gas solubility state by determining a percentage saturation of the shock strut, and
   wherein the ECU determines the percentage saturation of the shock strut by calculating $K_{SAT} \times \int SAT\ dt + K_{SAV} \times \int SAV\ dt + K_{SATV} \times \int SAT^m \times SAV\ dt$;
   wherein $K_{SAT}$, $K_{SAV}$, and $K_{SATV}$, and n are obtained from the strut specific design data;
   wherein SAT is shock strut travel; and
   wherein SAV is shock strut velocity.

8. The system of claim 7, wherein the ECU is programmed to determine whether a landing condition of the shock strut is met.

9. The system of claim 8, wherein the landing condition includes a loaded position of the shock strut.

10. The system of claim 7, wherein the ECU calculates the present gas solubility state by multiplying the determined percentage saturation of the shock strut by Henry's characteristic H(C) for the shock strut, by the pressure of the gas, and by a volume of oil of the shock strut.

* * * * *